Dec. 16, 1958     A. A. A. E. LEMOINE     2,864,580
COCK INCLUDING A SLEEVE-SHAPED PACKING
Filed Feb. 14, 1955     2 Sheets-Sheet 2
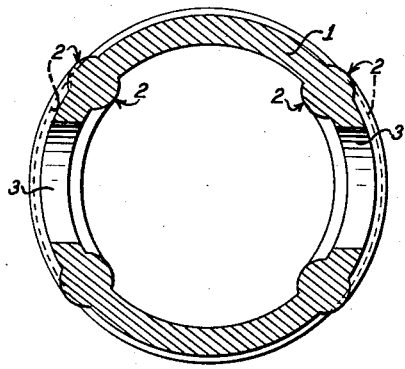
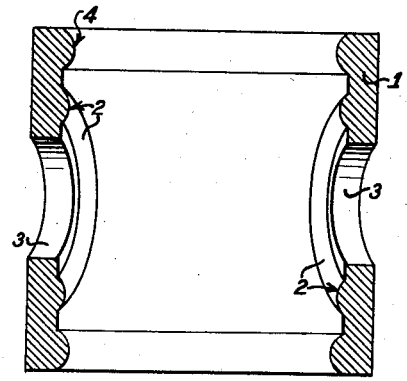
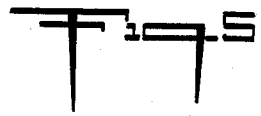
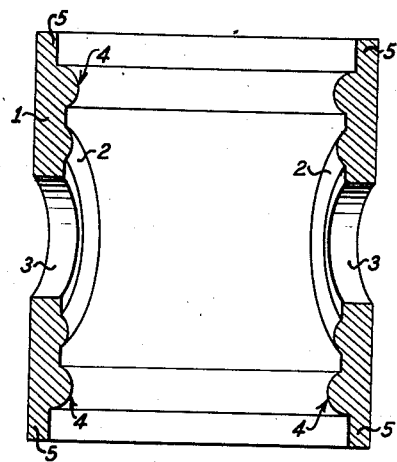
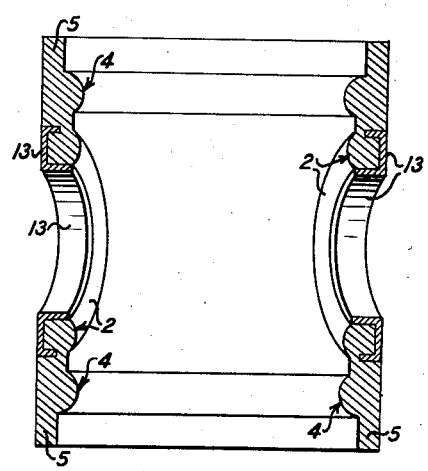

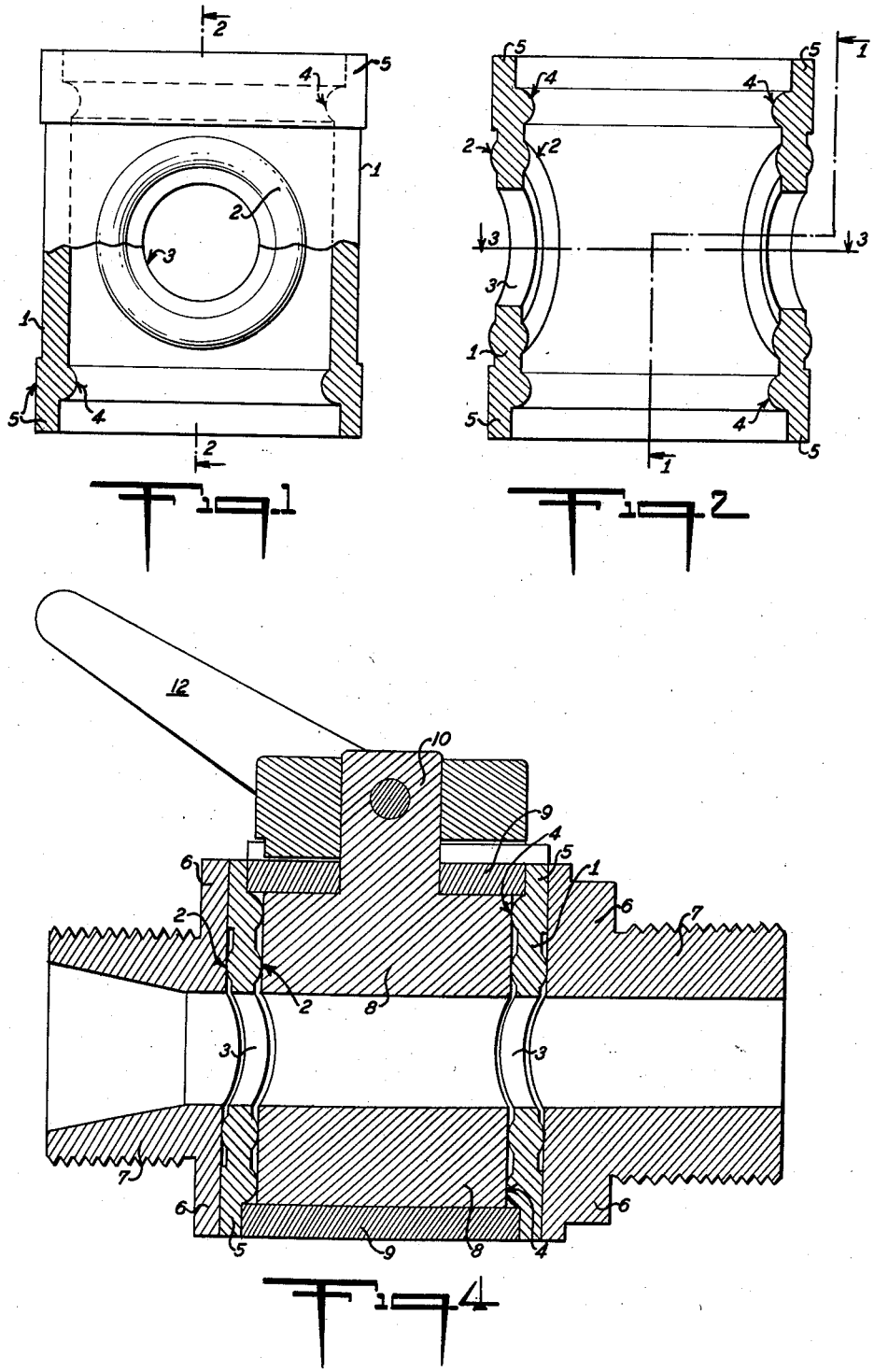

United States Patent Office 2,864,580
Patented Dec. 16, 1958

2,864,580
COCK INCLUDING A SLEEVE-SHAPED PACKING

André Alfred Arsène Edouard Lemoine, Paris, France, assignor to Auxim l'Auxiliaire de l'Industrie et des Mines, Saint-Etienne, France, a company of France Application February 14, 1955, Serial No. 487,975

Claims priority, application France March 15, 1954

2 Claims. (Cl. 251—317)

My invention has for its object an improved unitary plastic sleeve-shaped packing for cocks of the type including a transversely bored rotary plug housed inside a cylindrical recess extending through the shell across the cylindrical passage provided for the fluid, said plug being adapted to open and close said passage according to the angular position assumed by the bore therein. The object of my invention is to provide such a sleeve on which are formed two pairs of reinforcements of the same elastic material one pair of which surrounds the openings in the side wall of the sleeve registering with the openings of the fluid passage in the shell while the reinforcements of the other pair are provided in transverse cross-sections of the sleeve lying to either side of the fluid passage.

This unitary sleeve forms a technically interesting substitute for the independent reinforcing rings provided at the locations referred to and held in position by a separate sleeve and associated terminal covers.

I have illustrated in the accompanying drawings preferred embodiments of my invention, said embodiments being given by way of a mere exemplification. In said drawings:

Fig. 1 is a half-sectional front view of my improved unitary sleeve, the cross-section being executed through line 1—1 of Fig. 2.

Fig. 2 is a vertical sectional view through line 2—2 of Fig. 1.

Fig. 3 is a plan view of the sleeve as seen from above, part of it being shown cross-sectionally through line 3—3 of Fig. 2.

Fig. 4 is a sectional view of a cock provided with a rotary plug, fitted with such a sleeve.

Figs. 5, 6 and 7 are sectional views of modified embodiments of the sleeve.

As illustrated, my improved sleeve 1 of rubber or the like plastic material is provided with two annular projections or beads 2 projecting beyond the wall of the sleeve at least to one side of the sleeve and in the case illustrated to both sides thereof, said beads surrounding the openings or ports 3 in the sleeve wall which register with the bores or fluid passages formed in the shell of the cock as shown in Fig. 4. The sleeve 1 is furthermore provided with two other annular projections or beads 4 arranged along transverse cross-sections of the sleeve, projecting at least to one side of the latter and located to either side of the transverse geometrical cylinder defined by the first mentioned beads 2 so as to register with the outer portions of the transverse recess in the cock.

The sleeve is also provided in the embodiment illustrated in Figs. 1 and 2 with terminal skirts 5 of a reduced thickness at either end, the purpose of said terminal skirts thus extending beyond the beads 4 being disclosed hereinafter.

The sleeve thus designed is positioned permanently inside the transverse cylindrical bore of the shell of the cock as shown in Fig. 4, the openings 3 provided coaxially inside the beads 2 forming fluid input and output ports registering with the bores in the pipe sections 7 forming the fluid passageway through the cock.

The cock is provided with a rotary plug 8 inside a cylindrical transverse recess in the shell, the sleeve 1 lying thus between said rotary plug and the wall of the transverse cylindrical recess in the cock. Thus, the beads 2 and the beads 4 are permanently compressed between said plug and said wall so as to provide perfect fluidtightness without any unnecessary friction between the remainder of the sleeve wall and the rotary plug.

As to the skirts 5, they are held fast in contacting relationship with the inner peripheral wall of the bore in said shell 6 by means of covers or stoppers 9 fitted in the two ends of said bore, one of said covers affording a passage for the shank 10 carried by the plug so as to allow its control through an external handle or the like control member 12.

These skirts or extensions 5 form thus further fluidtight means which in no means reduce the main sealing action ensured by the beads 2 cooperating therewith.

According to a modification illustrated in Fig. 5, the sleeve is not provided with any extension such as 5 and its set of beads 2 arranged coaxially with reference to the fluid conveying ports 3 projects only towards the inside of the sleeve.

Fig. 6 illustrates a further embodiment similar to that described with reference to Fig. 5, with the difference that it retains extensions 5 similar to those referred to herein above, said extensions 5 projecting if required radially beyond the outer surface of the sleeve, said latter feature not being illustrated.

Fig. 7 lastly illustrates a still further modification similar to that illustrated in Fig. 6, with the difference however that the inner periphery of the circular port 3 is reinforced by a metal member 13 embedded in the molding inside the material forming the sleeve.

What I claim is:

1. In combination with a cock including a shell provided with a longitudinal fluid-conveying channel opening into a cylindrical recess extending transversely across said channel and a transversely bored rotary plug mounted loosely inside said transverse recess a cover engaging the inside of the transverse recess at either end thereof and covering the corresponding outer end of the rotary plug, the provision of a unitary sleeve of elastic material carried by the wall of the cylindrical recess and including a cylindrical body inserted between the plug and said wall and provided with circular ports registering with the openings of the longitudinal channel into the transverse recess, a first pair of annular beads formed in one with said body projecting clearly at least inwardly of said body along solid annular sections of the latter, surrounding the corresponding ports in the sleeve at a short distance outside the latter and adapted to be clamped with said solid sections between the rotary plug and the recess wall and a second pair of annular beads coaxial with and in one with the sleeve body at a small distance from the outer ends of said sleeve body, projecting clearly at least inwardly of said sleeve body along solid annular sections of the latter, located on opposite sides of the geometrical cylinder defined by the first two beads, and adapted to be clamped with last-mentioned solid sections of the sleeve registering therewith between the rotary plug and the recess wall and a short thinner skirt-shaped extension of the sleeve body at each end thereof, adapted to project beyond the corresponding end of the rotary plug and to be clamped between the cover at said end and the wall of the transverse recess in the shell.

2. In combination with a cock including a shell provided with a longitudinal fluid-conveying channel opening into a cylindrical recess extending transversely across said channel and a transversely bored rotary plug mounted loosely inside said transverse recess, the provision of a unitary sleeve of elastic material carried by the wall of the cylindrical recess and including a cylindrical body inserted between the plung and said wall and provided with circular ports registering with the openings of the longitudinal channel into the transverse recess, a first pair of annular beads formed in one with said body, projecting clearly at least inwardly of said body along solid annular sections of the latter, surrounding the corresponding ports in the sleeve at a short distance outside the latter, and adapted to be clamped with said solid sections between the rotary plug and the recess wall and a second pair of annular beads coaxial with and in one with the sleeve body at a small distance from the outer ends of said sleeve body, projecting clearly at least inwardly of said sleeve body along solid annular sections of the latter, located on opposite sides of the geometrical cylinder defined by the first two beads, and adapted to be clamped with last-mentioned solid sections of the sleeve registering therewith between the rotary plug and the recess wall and a metal sheet reinforcement fitted along the outer surface of the sleeve round the edge of each circular port therein and extending inwardly along a portion of the wall of said port.

References Cited in the file of this patent

UNITED STATES PATENTS

| | | |
|---|---|---|
| 1,849,580 | Klinger | Mar. 15, 1932 |
| 1,883,662 | Fisher | Oct. 18, 1932 |
| 2,210,335 | Mueller | Aug. 6, 1940 |

FOREIGN PATENTS

| | | |
|---|---|---|
| 698,991 | Great Britain | of 1953 |
| 883,374 | Germany | July 16, 1953 |